United States Patent
Hake et al.

(10) Patent No.: US 6,478,373 B1
(45) Date of Patent: Nov. 12, 2002

(54) AUTOMOTIVE SEAT—SEAT BACK WITH INTEGRATED PROTECTIVE DEVICE AND PROCESS TO PREVENT INJURIES CAUSED BY ACCIDENT

(75) Inventors: Ernst-Jürgen Hake, Radevormwald (DE); Hans-Joachim Müller, Bergisch Gladbach (DE); Gerhard Schmale, Huckeswagen (DE); Lutz Strieder, Rernscheid (DE)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/640,427

(22) Filed: Aug. 17, 2000

(30) Foreign Application Priority Data

Aug. 17, 1999 (DE) .......................................... 199 38 904

(51) Int. Cl.$^7$ ................................................. B60N 2/42
(52) U.S. Cl. ............................ 297/216.13; 297/216.12; 297/216.14
(58) Field of Search ....................... 297/216.12, 216.13, 297/216.14

(56) References Cited

U.S. PATENT DOCUMENTS

| 5,795,019 A | | 8/1998 | Wieclawski | |
|---|---|---|---|---|
| 5,823,619 A | * | 10/1998 | Hellig et al. | 297/216.12 |
| 5,833,312 A | | 11/1998 | Lenz | |
| 5,927,804 A | * | 7/1999 | Cuevas | 297/216.12 X |
| 6,019,424 A | * | 2/2000 | Ruckert et al. | 297/216.12 |
| 6,033,018 A | * | 3/2000 | Fohl | 297/216.13 |
| 6,273,511 B1 | * | 8/2000 | Wicciawski | 297/216.12 |

FOREIGN PATENT DOCUMENTS

| DE | 199 38 940 A1 | 3/2000 |
|---|---|---|
| DE | 199 45 411 A1 | 3/2000 |
| GB | 2340801 | 3/2000 |

* cited by examiner

*Primary Examiner*—Anthony D. Barfield
(74) *Attorney, Agent, or Firm*—Foley & Lardner

(57) ABSTRACT

A seat back for an automotive seat with an integrated protective device and a process for preventing injuries to a seat occupant caused by an accident in the event of a rear-end impact. The seat back features a bottom seat-back part and a top seat-back part that, by means of a torque, pivots around an axis in the seat back that is perpendicular to the longitudinal axis of the vehicle, out of a position of standard use and into a safety position. To improve the efficiency of such a seat back, it is proposed that the protective device features a device that generates the torque regardless whether the automotive seat is occupied, and means for detecting a rear-end impact, which are actively linked with the torque-generating device in such a way that the device is activated in the event of a rear-end impact and the swinging movement is started.

26 Claims, 3 Drawing Sheets

AUTOMOTIVE SEAT— SEAT BACK WITH INTEGRATED PROTECTIVE DEVICE AND PROCESS TO PREVENT INJURIES CAUSED BY ACCIDENT

TECHNICAL FIELD OF THE INVENTION

The present invention relates to a seat back for an automotive seat with an integrated protective device to prevent injuries, especially cervical syndrome and whiplash, caused by a rear-end impact.

BACKGROUND OF THE INVENTION

Modern developments in automotive engineering frequently make use of the materials and structural methods available to build the seat-back parts of automotive seats with low weight but with high stiffness to withstand the high strains occurring in an accident and to adequately support a seat occupant. An injury to the cervical musculature and cervical vertebral column of a seat occupant can occur, however, in a so-called bumper-thumper at low speed in the range of 10 to 30 km/hr. (low speed crash) in which the body undergoes a relatively low acceleration (about 8–20 g), because the impact force acts nearly uncushioned upon the seat occupant. An undesired so-called whipping effect may occur on the head and neck that leads to an overstretching and overstraining of the cervical vertebral column and the cervical musculature. This effect and the possible spinal column injuries, especially around the neck, are known by the English term "whiplash."

Passive and active devices to protect against whiplash are known, wherein active devices are supposed to actively shorten the distance between the head of the seat occupant and head restraint of the seat back in case of an accident. The reference D19743339AI describes such a known active device. In this reference, the body of the seat occupant, which is accelerated due to its inertia into the seat back of the automotive seat or is bent backwards in a collision, strikes a baffle plate installed underneath the swiveling axis of the top seat-back part and connected with a swivel mount to the top seat-back part, especially with a head restraint. The head restraint swings forward from the relative motion of the baffle plate to the rear. The motion of the head restraint is supposed to mitigate the action of the whipping effect.

A disadvantage in this technique is that the relative motion of the head restraint is activated by the seat occupant being flung into the seat back. The top seat-back part can thereby only be accelerated in the pivot direction by a value that at most equals the acceleration that the seat occupant experiences from the collision. But since the motion of the seat occupant can't be precisely predicted in every case, incorrect and undesired effects could therefore occur from the active counter movement of the seat back and head restraint, depending on the circumstances. The impact of the seat occupant can thus even be strengthened, and the seat occupant can not be prevented from rising up (vertical motion upwards within the seat). In a rear-end impact, the seat occupant is flung into the seat back, which is inclined towards the back most of the time, in such a manner that the seat occupant tends to rise up on the seat back, like a ramp. In the conventional techniques of the art, this causes the seat back to fail, snapping from overload, and no longer being capable of supporting the seat occupant. In particular, the head of the seat occupant can end up in such a high position, above the head restraint, where it can no longer be supported. A considerable accident residual risk therefore exists in the case of the conventional seat back.

It is the objective of the present invention to create, with inexpensive structural means, a seat back of the type mentioned, whose protective device ensures improved protection of the seat occupant against injury, especially by improving the possibility of interception and cushioning when the head and upper body of the seat occupant strikes the head restraint or seat back.

It is additionally the objective of the present invention to create, with inexpensive means, a process of the type mentioned, with which the accident residual risk can be substantially reduced compared to the known techniques in the art.

SUMMARY OF THE INVENTION

In the seat back according to invention, the protective device first features a device that generates a torque operating on the top seat-back part in the pivot direction, regardless whether the automotive seat is occupied, and secondly features means for detecting a rear-end impact that is actively linked with the torque-generating device in such a way that the device is activated in the event of a rear-end impact and the swinging movement is started.

In the process according to invention, the top seat-back part is accelerated in the pivot direction at a considerable rate. The acceleration rate that the automotive seat will primarily experience from a rear-end impact will preferably lie in the range of about 60 to 200 m/sec$^2$, preferably in the range of about 60 to 90 m/sec$^2$. The process according to invention can be carried out to advantage with the seat back according to invention, since the protective device isn't activated by the seat occupant, but by the means for detecting the rear-end impact in cooperation with the device that generates the torque operating on the top seat-back part.

At the same time, the swinging of the top seat-back part can preferably commence quickly enough that the top seat-back part will be situated in its safety position before the movement of the head of the seat occupant caused by the rear-end impact. In its safety position, the top seat-back part lies directly against the body of the seat occupant, so that, in spite of the acceleration operating upon the seat occupant from the collision, the seat occupant advantageously can no longer move freely backwards, opposite the direction of vehicular travel, and sustain injuries from the accident.

The swinging of the top seat-back part out of its standard use position into its safety position can preferably be completed approximately 35 to 60 ms after the rear-end impact, and after this time the top seat-back part can preferably be situated in its safety position in the state of rest or nearly in the state of rest. This is possible, since the means for detecting the rear-end impact, such as an acceleration sensor, can be designed such that it becomes operative within about 8 to 17 ms. The torque-generating device can thereby be activated 15 to 33 ms after the rear-end impact and the safety position can be achieved after the extremely short time span mentioned above. A state of rest of the top seat-back portion, preferably in the safety position, will assure that the counter movement of the top seat-back part and the body of the seat occupant will be minimized when they meet.

In the seat back according to invention, it is particularly preferable in regard to the efficiency of the protective device, for a head restraint to be fastened in or on the top seat-back part. However, the top seat-back part can also be designed in such a manner that it takes over the function of a head restraint. In any case, the seat occupant can thereby move into the back support uniformly under conditions of decelerating energy absorption by the automotive seat, especially for special protection of the head and neck region.

In addition, a system that acts purely passively can be applied in the seat back at the same time if necessary, such as a system that automatically fits itself optimally to the seat occupant and the contours of the back, the shoulders, and/or the head of the seat occupant while the accident is occurring, whereby the kinetic energy is converted to deformation work (plastic expansion/upsetting).

It is currently endeavored to situate head restraints into a so-called comfort position, in which their distance to the head of the seat occupant is about 80 to 120 mm, when the seat back is in its standard use position. By swinging the top seat-back part, the head restraint is then moved into a so-called intercept position, in which its distance to the head of the seat occupant is zero or nearly zero. When a head restraint is present, everything stated above or below about the standard use position and the safety position of the top seat-back part consequently also applies to the comfort and intercept positions of the head restraint.

Another meaningful advantage of the invention consists of the fact that the seat occupant can be prevented from rising up in the seat during a rear-end impact, because the safety position of the top seat-back part, or the intercept position of the head restraint respectively, occurs at the right time.

BRIEF DESCRIPTION OF THE DRAWINGS

Further features and advantages of the invention will become apparent from the following discussion and accompanying drawings, in which.

DETAILED DESCRIPTION OF THE PREFERRED EMBODIMENT

Figure 1:
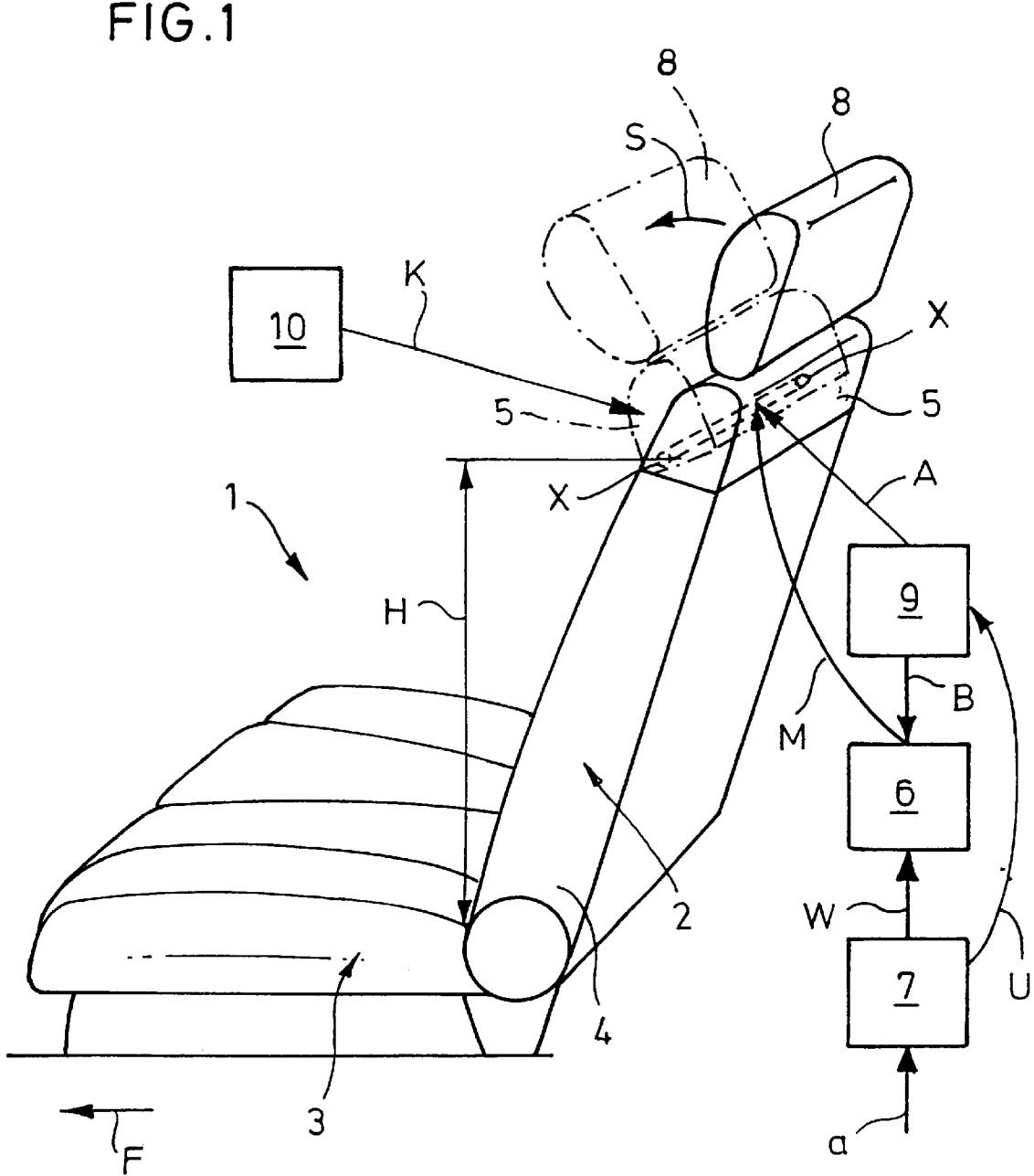
FIG. 1 is a partially schematized side view of a seat back according to the present invention.

The following description of the preferred embodiment is merely exemplary in nature, and is in no way intended to limit the invention or its application or uses. The same parts are always provided with the same labels in the different figures of the drawing, so that they will each only be described once.

As shown in FIG. 1, an automotive seat 1 consists of a seat back 2 according to invention and a seat part 3. A protective device, for protecting the seat occupant against injuries caused by an accident, especially cervical syndrome and whiplash in case of a rear-end impact, is integrated into the seat back 2. The seat back 2 features a bottom seat-back part 4, that is connected with the seat part 3, and a top seat-back part 5, that can pivot in an angular range relative to the bottom seat-back part 4 out of a standard use position (drawn with a solid line in FIG. 1), around an axis X—X in the seat back 2 that runs perpendicular to the longitudinal axis of the vehicle, and along a pivot direction S pointing in the direction of travel F by means of a torque operating in the pivot direction S.

According to invention, the protective device first features a device 6, which generates a torque M operating on the top seat-back part 5 in the pivot direction S, regardless whether the automotive seat 2 is occupied, and secondly features detecting means 7 for detecting a rear-end impact. Both the torque-generating device 6 and the detecting means 7 can be designed differently. These parts of the seat back 2 according to invention are therefore only drawn schematically as small boxes in FIG. 1.

By way of example, the torque-generating device 6 can preferably be built from an energy accumulator or energy storage device, especially a prestressed spring element or several prestressed spring elements.

The detecting means 7 for detecting the rear-end impact can preferably be built from a vehicle crash sensor, such as an acceleration sensor. To detect a so-called low speed crash, the vehicle crash sensor can be set in such a manner that it reacts at an acceleration of approximately 40 to 80 m/sec$^2$. The detecting means 7 is actively linked (as indicated by arrow W) with the torque-generating device 6 in such a way that the device 6 is activated in the event of a rear-end impact and the swinging movement of the top seat-back part 5 is started. At the same time, the bottom seat-back part 4 remains in its original (standard use) position.

The bottom seat-back part 4 and the top seat-back part 5 can preferably be synchronized to each other in a defined manner with respect to their respective lengths (not illustrated in detail), and the axis X—X running perpendicular to the longitudinal axis of the vehicle, around which the top seat-back part 5 pivots, can be installed at a defined height H in the shoulder region of the seat occupant, preferably about 400 to 580 mm above the seat part 3.

A head restraint 8 that in the event of a rear-end impact, moves out of a comfort position (indicated with a solid line in FIG. 1), in which its distance to the head of the seat occupant is about 80 to 120 mm, into an intercept position (drawn with a dot-dashed line in FIG. 1), in which the distance to the head of the seat occupant is zero or nearly zero, is fastened in or to the top seat-back part 5.

In addition, arresting means 9, for fastening the top seat-back part 5 into its standard use position, are provided in the preferred embodiment of the invention. The fastening is drawn by arrow A in FIG. 1. The arresting means 9 can also be designed in different ways. The arrow B in FIG. 1 indicates that the arresting means 9 can block the action of the torque-generating device 6. The detecting means 7 for detecting a rear-end impact can be actively linked (arrow U in FIG. 1) in such a way with the arresting means 9 for fastening the top seat-back part 5 into its standard use position, that the fastening A of the top seat-back part 5 into its standard use position and the blocking B of the torque-generating device 6 are both canceled in the event of a rear-end impact.

Additional arresting means 10, whose effect is shown by the arrow K in FIG. 1 and which will be explained in more detail below in reference to FIG. 2, can be provided for fastening the top seat-back part 5 against a return movement from its safety position into its standard use position.

Figure 2:
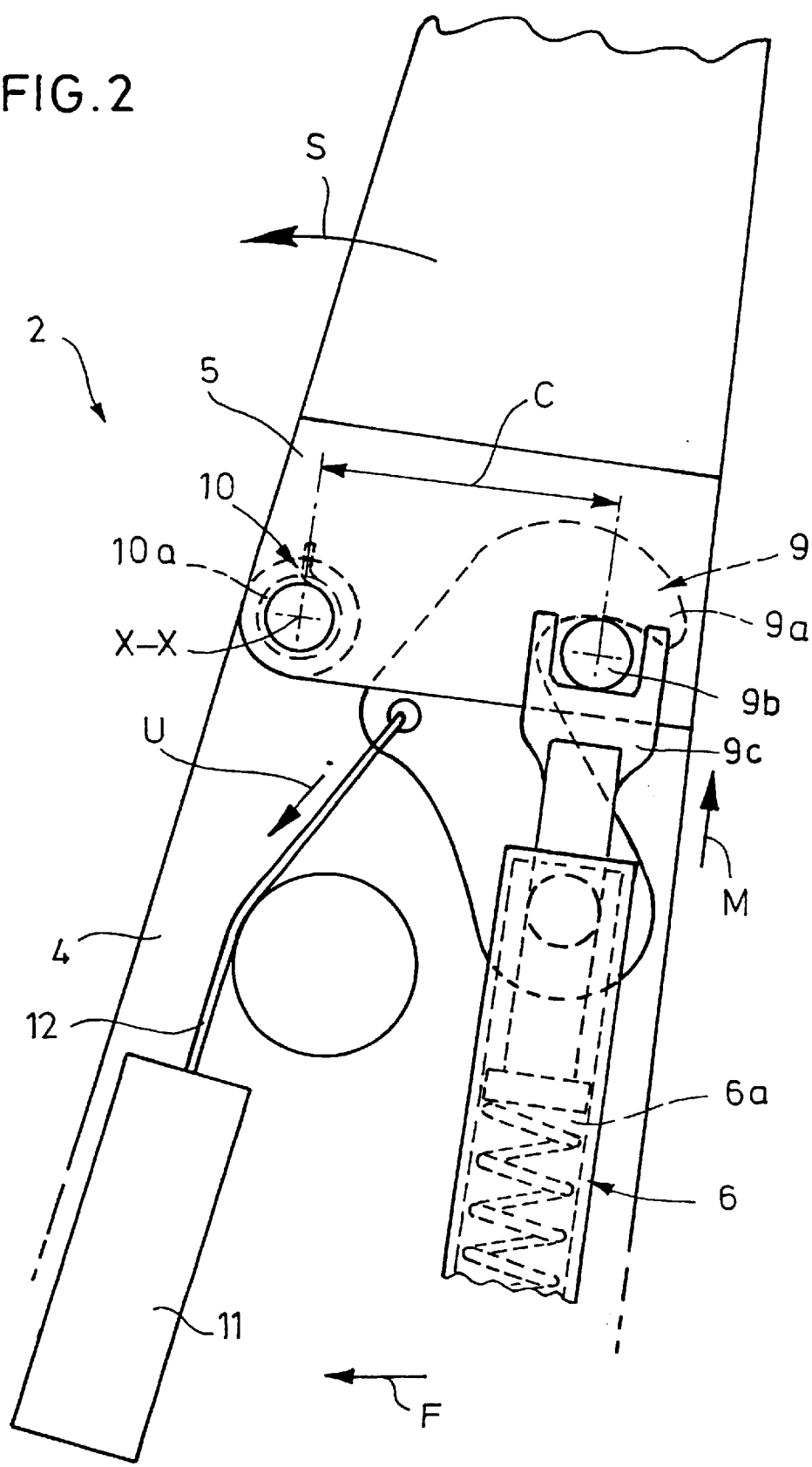
FIG. 2 is an enlarged side cross-sectional view of a detail of a seat back according to the present invention.

FIG. 2, which shows an enlarged detail of the seat back 2 according to the invention in a transitional region from the bottom seat-back part 4 to the top seat-back part 5, illustrates a possible embodiment including the device 6 that generates the torque M in the pivot direction S operating on the top seat-back part 5 regardless whether the automotive seat 2 is occupied, the arresting means 9 for fastening the top seat-back part 5 into its standard use position, the arresting means 10 for fastening the top seat-back part 5 against a return movement from its safety position into its standard use position, and how the detecting means 7 for detecting the rear-end impact can be actively linked (arrow U) with the arresting means 9 for fastening the top seat-back part 5 into its standard use position.

As previously mentioned in reference to FIG. 1, the torque-generating device 6 in FIG. 2 is designed as a prestressed spring element, and here specifically as a pressure spring 6a that is fastened to the bottom seat-back part 4 and acts upon the top seat-back part 5. Very high actuating forces and a very high torque M, which make it possible to swing the top seat-back part 5 in a matter of milliseconds, can be advantageously generated by such a pressure spring 6a. At the same time, the swiveling axis X—X in the seat back 2 running perpendicular to the longitudinal axis of the vehicle for the top seat-back part 5 is arranged off-center to an axis of the seat back 2 that runs approximately vertical on the side facing the direction of travel F, and the pressure spring 6a is arranged approximately parallel and off-center to the axis of the seat back 2 that runs approximately vertical on the side facing opposite the direction of travel F, so that the spring power becomes operative underneath a maximum lever arm C. This lever arm C is determined by the thickness of the seat back 2, and causes the generation of a maximum torque M in the illustrated embodiment. Alternatively, the spring element could also be formed by a torsion spring arranged around the swiveling axis X—X for example.

It is preferred that the spring element features a descending characteristic curve with a high starting force for generating a strong acceleration, but with a very small final force. This takes into account the fact that, because of its arrangement in the vehicle, the top seat-back part 5 experiences an acceleration from the crash that opposes the action of the spring. It is preferable for the torque-generating device 6 to be designed in such a manner that, in the event of its activation, it accelerates the top seat-back part 5 in the pivot direction S at a considerable rate, as it is a more moderate or preferably empirically determined more average acceleration rate a that the automotive seat 2 experiences from the rear-end impact. The value can be set by the characteristic curve of the spring.

The arresting means 9 for fastening the top seat-back part 5 into the standard use position, can be preferably be made, as shown in FIG. 2, by a lock-out device operating with positive or non-positive locking, such as by the latching elements 9a, 9b, 9c or a similar latch mounting.

The detaching means 7 is actively linked (arrow U) with the arresting means 9 with a pyrotechnic activator 11, which is ignited by a signal from the detaching means 7 (shown in FIG. 1), and cancels the lock-out of the latching elements 9a, 9b, 9c by means of a traction mechanism 12 for example, the lock-out operating with positive or non-positive locking.

As an alternative to the sensor design, the detecting means 7 can also be fashioned from a mechanical control system that features mechanical parts, which, when accelerated by the impact of the rear-end collision, will disengage a detent pawl (such as similar to that shown in FIG. 2) to bring about an unlocked state. This also corresponds to a direct active linkage U of the detecting means 7 on the arresting means 9.

The case indicated by arrow W in FIG. 1, that the detecting means 7 have a direct active linkage with the torque-generating device 6, exists for example, when the torque-generating device 6 isn't a spring element subjected to prestress, but an energy accumulator or energy storage device similar to the pyrotechnic activator 11.

As shown in FIG. 2, an overrunning spring 10a placed around the swiveling axis X—X is installed as arresting means 10 for fastening the top seat-back part 5 against a return movement from its safety position into its standard use position. This overrunning spring 10a holds back the top seat-back part 5 (against the pivot direction S) to swing more and more tightly around the axis of rotation X—X and holds this axis fast, so that a return swing isn't possible. A ratchet design of the arresting means 10 for fastening the top seat-back part 5 would also be suitable for example, as an alternative to the spring 10a that is shown.

Figure 3:
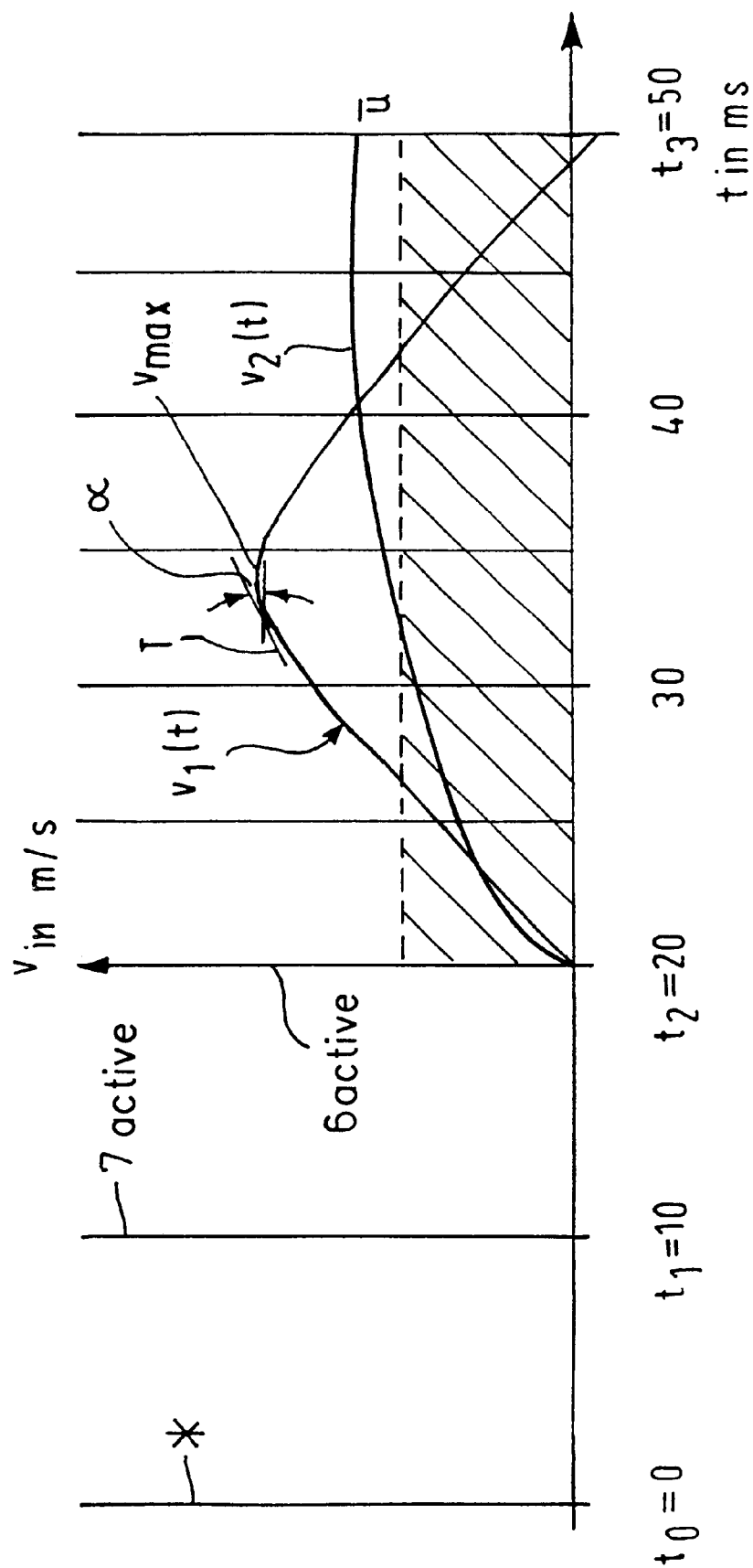
FIG. 3 shows the individual process steps and an example of the shape of the swivel-speed v (in m/s) of the top seat back part on an axis for time t (in milliseconds).

As shown in FIG. 3, the process according to invention serves to keep the accident from causing injuries to a seat occupant in the event of a rear-end impact, especially cervical syndrome and whiplash. In this connection, a protective device, which is integrated into the seat back 2 of an automotive seat 1 with a bottom seat-back part 4 connected with a seat part 3 and with a top seat-back part 5, is provided (as shown in FIG. 1). In the event of a rear-end impact, the top seat-back part 5 will pivot in an angular range relative to the bottom seat-back part 4 out of a position of standard use around an axis X—X in the seat back 2 that runs perpendicular to the longitudinal axis of the vehicle and into a pivot direction S pointing in a direction of travel F by means of a torque M operating in the pivot direction S. At the same time, the top seat-back part 5 is accelerated in the pivot direction S at a considerable rate, as it is a more moderate or empirically determined more average acceleration rate "a" that the automotive seat 1 experiences from the rear-end impact. In this connection, it can be assumed according to invention, that this average acceleration rate "a" lies in the range of approximately 35 to 200 m/sec$^2$, preferably in the range of approximately 60 to 90 m/sec$^2$. In particular, the top seat-back part 5 can quickly swing in such a manner in the process according to invention, that it is situated in its safety position before the head movement of the seat occupant, caused by the rear-end impact, starts.

As shown in FIG. 3, it is assumed that the rear-end impact occurs at time $t=t_0=0$ ms. This is indicated by the label "* ". It is assumed that the movement of the seat occupant caused by the rear-end impact starts at time $t=t_3=50$ ms. In accordance with the illustrated example, the swinging of the top seat-back part 5 out of its standard use position into its safety position is completed in this time. In this connection, the corresponding maximum time $t_3$ can vary according to invention in a wider range, approximately 35 to 60 ms.

In the process according to invention, the torque M is preferably generated by a device 6 of the protective device, as it is described above. This device 6 generates a torque M operating on the top seat-back part 5 in the pivot direction S, regardless whether the automotive seat 2 is occupied. The rear-end impact will preferably, as also described above, be detected by the detecting means 7, which is actively linked with the torque-generating device 6 in such a manner, that they activate the device 6 in the event of a rear-end impact and that the swinging movement is started. In general, all of the characteristics of the previously described seat back 2 according to invention can be present when needed to realize the process according to invention.

At the same time, the detecting means 7 for detecting the rear-end impact can preferably become operative within a maximum time interval of $t=t_1$ from about 8 to 17 ms. In FIG. 3, this is indicated by the label "7 active" at $t_1=10$ ms. As already mentioned, the swinging of the top seat-back part 5 can be triggered at an acceleration "a" of approximately 40 to 80 m/sec$^2$.

The torque-generating device 6 can preferably be activated within a time interval of $t=t_2$ of at most about 15 to 33 ms after the rear-end impact. In FIG. 3, this is indicated by the label "6 active" at $t_2=20$ ms.

A head restraint 8 fastened in or on the top seat-back part 5 can now, after the activation of the torque-generating device 6, move out of a so-called comfort position, in which the distance to the head of the seat occupant is about 80 to 120 mm, into an intercept position, in which its distance to the head of the seat occupant is zero or nearly zero. The path covered and an average velocity $\bar{u}$ (dashed line) thereby arise in the time interval between $t_2$ and $t_3$.

If it is assumed that the top seat-back part 5 will first be situated in its comfort position and then in its safety position in a state of rest or nearly in a state of rest, then a shape of the velocity v(t) that varies with time must be taken as a basis for the swiveling movement of the head restraint 8 or the top seat-back part 5, respectively. The corresponding curves in FIG. 3 show examples of a first and a second shape for the velocity, $v_1(t)$ and $v_2(t)$, although the examples are strongly idealized (without taken the counter effect of the crash into consideration and assuming a linear motion as the first approximation).

In this connection, the path s covered during the swinging corresponds to the area under the curve, where the relationship $$s = \int_{t_2}^{t_3} v(t)dt = \bar{u}(t_3 - t_2)$$

holds. Instead of this, the variable acceleration a can be determined from the relationship $$a = \frac{dv(t)}{dt} = \tan \alpha,$$

where α is the inclination angle of a tangent T adjacent to the curve. The force (such as the characteristic curve of a spring element as torque-generating device 6) required for the swinging movement can be derived from the shape of the acceleration.

The head restraint 8 or the top seat-back part 5, respectively, will be accelerated to a maximum velocity $v_{max}$, corresponding to the first shape $v_1(t)$ of the velocity and then decelerated again. A spring element could likewise be introduced again for deceleration, whose action would oppose the action of the pressure spring 6a. The descending and also nonlinear (with progressive or degressive slope, for example) shape described above can easily be introduced for the mutual (summed) characteristic curve of this spring element and the pressure spring 6a in the torque-generating device 6.

To achieve the average velocity $\bar{u}$, the head restraint 8 or top seat-back part 5 only needs to be steadily accelerated by a small velocity v corresponding to the second shape $v_2(t)$ of the velocity, as this is the case according to the first shape $v_1(t)$ of the velocity, since a steady deceleration will not occur again after the maximum velocity has been attained. To achieve this, the top seat-back part 5 is situated in its safety position in the state of rest or nearly in the state of rest, a limit stop can be provided in an appropriate angular position.

In the described embodiment of the invention, the present safety device, which is integrated in the seat back 2 according to invention but not illustrated, is formed by the bottom seat-back part 4, the top seat-back part 5 with the head restraint 8 that swings around the axis X—X, the torque-generating device 6, the detecting means 7 for detecting a rear-end impact, the arresting means 9 for fastening the top seat-back part 5 in its standard use position, the arresting means 10 for fastening the top seat-back part 5 against a return movement from its safety position into its standard use position, and by the pyrotechnic activator 11 including the traction mechanism 12. But as is already clear from the above description, the invention, both the seat back 2 and the process, is not restricted to the illustrated example, but includes all embodiments, several of which that have been mentioned, that operate the same as the spirit of the invention. As far as the illustrated drawing is concerned, FIGS. 1 through 3 are not drawn to scale, but schematized and partially illustrated in exaggerated form (like the angle between the top seat-back part 5 and the bottom seat-back part 4 in FIG. 1) for better visibility.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

We claim:

1. A seat back for an automotive seat comprising:
    a bottom seat-back part, connectable to a seat part;
    a top seat-back part connected to said bottom seat-back part for pivotal movement in an angular range relative to said bottom seat-back part out of a position of standard use, around an axis in said seat back that runs perpendicular to a longitudinal axis of the vehicle, and along a pivot direction pointing in the direction of vehicle travel;
    a torque generating means for generating a torque operating on said top seat-back part in said pivot direction, regardless whether the automotive seat is occupied; and
    detecting means for detecting a rear-end impact, which is actively linked with said torque-generating means in such a way, that said torque-generating means is activated in the event of a rear-end impact and the swinging movement is started.

2. The seat back of claim 1 further comprising a head restraint coupled to said top seat back part, wherein said head restraint moves out of a comfort position, in which its distance to the head of the seat occupant is about 80 to 120 mm, into an intercept position, in which the distance to a head of the seat occupant is zero or nearly zero.

3. The seat back of claim 1 wherein said torque-generating means includes an energy accumulator or energy storage device.

4. The seat back of claim 1 wherein said torque-generating means includes a prestressed spring element.

5. The seat back of claim 1 further comprising arresting means for fastening said top seat-back part into its standard use position.

6. The seat back of claim 3 wherein said detecting means for detecting a rear-end impact are actively linked in such a way with said arresting means for fastening said top seat-back part into its standard use position, that said fastening of said top seat-back part into its standard position is canceled in the event of a rear-end impact.

7. The seat back of claim 5 wherein said arresting means for fastening said top seat-back part into its standard use position is made by latching elements.

8. The seat back of claim 1 further comprising arresting means for fastening said top seat-back part against a return movement from its safety position into its standard use position.

9. The seat back of claim 8 wherein said arresting means for fastening said top seat-back part against a return movement from its safety position into its standard use position is formed by an overrunning spring.

10. The seat back of claim 1 wherein said detecting means for detecting the rear-end impact include an acceleration sensor.

11. The seat back of claim 10 wherein said vehicle acceleration is set in such a manner that it reacts at an acceleration of approximately 40 to 280 m/sec².

12. The seat back of claim 1 wherein said means for detecting the rear-end impact includes a mechanical control system located within said automotive seat.

13. The seat back of claim 1 wherein said torque-generating means is designed in such a manner, that, in the event of its activation, it accelerates said top seat-back part in said pivot direction at a greater rate than said automotive seat experiences from the rear-end impact.

14. The seat back of claim 1 wherein said bottom seat-back part and said top seat-back part are synchronized to each other in a defined manner with respect to their respective lengths and said axis running perpendicular to the longitudinal axis of the vehicle, around which said top seat-back part pivots, is installed at a defined height about 400 to 580 mm above said seat part.

15. A seat back for an automotive seat comprising:

a bottom seat-back part, connectable to a seat part;

a top seat-back part connected to said bottom seat-back part for pivotal movement in an angular range relative to said bottom seat-back part out of a position of standard use, around an axis in said seat back that runs perpendicular to a longitudinal axis of the vehicle, and along a pivot direction pointing in the direction of vehicle travel;

a torque generating means for generating a torque operating on said top seat-back part in said pivot direction, regardless whether the automotive seat is occupied, wherein said torque generating means includes a pre-stressed spring element;

detecting means for detecting a rear-end impact, which is actively linked with said torque-generating means in such a way, that said torque-generating means is activated in the event of a rear-end impact and the swinging movement is started; and wherein said spring element features a descending characteristic curve that generates a high starting force for generating a strong acceleration, but only a very small final force.

16. A seat back for an automotive seat comprising:

a bottom seat-back part, connectable to a seat part;

a top seat-back part connected to said bottom seat-back part for pivotal movement in an angular range relative to said bottom seat-back part out of a position of standard use, around an axis in said seat back that runs perpendicular to a longitudinal axis of the vehicle, and along a pivot direction pointing in the direction of vehicle travel;

a torque generating means for generating a torque operating on said top seat-back part in said pivot direction, regardless whether the automotive seat is occupied, wherein said torque generating means includes a pre-stressed spring element;

detecting means for detecting a rear-end impact, which is actively linked with said torque-generating means in such a way, that said torque-generating means is activated in the event of a rear-end impact and the swinging movement is started; and wherein said spring element is formed by a torsion spring arranged around said swiveling axis.

17. A seat back for an automotive seat comprising:

a bottom seat-back part, connectable to a seat part;

a top seat-back part connected to said bottom seat-back part for pivotal movement in an angular range relative to said bottom seat-back part out of a position of standard use, around an axis in said seat back that runs perpendicular to a longitudinal axis of the vehicle, and along a pivot direction pointing in the direction of vehicle travel;

a torque generating means for generating a torque operating on said top seat-back part in said pivot direction, regardless whether the automotive seat is occupied, wherein said torque generating means includes a pre-stressed spring element;

detecting means for detecting a rear-end impact, which is actively linked with said torque-generating means in such a way, that said torque-generating means is activated in the event of a rear-end impact and the swinging movement is started; and wherein said spring element is formed by a pressure spring that is fastened in said bottom seat-back part and acts upon said top seat-back part.

18. A process for preventing injuries to a seat occupant caused by accidents in case of a rear-end impact, by means of a protective device integrated into the seat back of an automotive seat with a bottom seat-back part connected with a seat part and with a top seat-back part, whereby in the case of a rear-end impact said top seat-back part pivots in an angular range relative to said bottom seat-back part out of a position of standard use around an axis in said seat back that runs perpendicular to the longitudinal axis of the vehicle and into a pivot direction pointing in the direction of travel into a safety position by means of a torque operating in said pivot direction, wherein said top seat-back part is accelerated in said pivot direction at a considerable rate, as it is a more moderate or empirically determined more average acceleration rate that said automotive seat experiences from the collision, and wherein the protective device operates regardless of whether said seat is occupied.

19. The process of claim 18 wherein the empirically determined more average acceleration rate that the automotive seat experiences from the rear-end impact lies in the range of approximately 35–200 m/sec$^2$.

20. The process of claim 18 wherein the swinging of the top seat-back part commences quickly enough, that the top seat-back part is situated in its safety position before a head movement of the seat occupant, caused by the rear-end impact, begins.

21. The process of claim 20 wherein the top seat-back part is situated in its safety position in the state of rest or nearly in the state of rest.

22. The process of claim 18 wherein the swinging of the top seat-back part out of its position of standard use into its safety position is completed no more than 35 to 60 ms after the rear-end impact.

23. The process of claim 18 wherein the torque is generated by a device of the protective device that generates a torque operating on the top seat-back part in the pivot direction, regardless whether the automotive seat is occupied, and the rear-end impact is detected by means that are actively linked with the torque-generating device in such a way, that the device is activated in the event of a rear-end impact and the swinging movement is started.

24. The process of claim 23 wherein the means for detecting the rear-end impact become operative within no more than about 8 to 17 Ms.

25. The process of claim 23 wherein the torque-generating device is activated no more than approximately 15 to 33 ms after the rear-end impact.

26. The process of claim 18 wherein the swinging of said top seat-back part is triggered at an acceleration of approximately 40 to 80 M/sec.

* * * * *